(12) United States Patent
Yamaki et al.

(10) Patent No.: US 7,067,731 B2
(45) Date of Patent: Jun. 27, 2006

(54) SOUND SOURCE CIRCUIT AND TELEPHONE TERMINAL USING SAME

(75) Inventors: Kiyoshi Yamaki, Iwata-gun (JP); Shinji Otaki, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 325 days.

(21) Appl. No.: 10/148,088

(22) PCT Filed: Nov. 29, 2000

(86) PCT No.: PCT/JP00/08422

§ 371 (c)(1),
(2), (4) Date: Oct. 15, 2002

(87) PCT Pub. No.: WO01/41122

PCT Pub. Date: Jun. 7, 2001

(65) Prior Publication Data

US 2003/0110928 A1    Jun. 19, 2003

(30) Foreign Application Priority Data

Nov. 29, 1999    (JP) .................................. 11-338737

(51) Int. Cl.
   *G10H 1/00*    (2006.01)

(52) U.S. Cl. ............................ 84/606; 84/604; 84/631; 379/374.01; 379/418; 455/567

(58) Field of Classification Search .................. 84/631, 84/664, 708, 604, 606; 379/374.01, 88.07, 379/418; 455/567; 381/61–63
See application file for complete search history.

(56) References Cited

U.S. PATENT DOCUMENTS

| 3,828,109 A | * | 8/1974 | Morez ......................... 84/672 |
| 4,038,898 A |   | 8/1977 | Kniepkamp et al. |
| 4,080,861 A |   | 3/1978 | Wholahan |
| 4,144,790 A | * | 3/1979 | Suchoff ........................ 84/708 |
| 4,369,336 A | * | 1/1983 | Agnello ....................... 381/61 |
| 4,384,505 A | * | 5/1983 | Cotton et al. ................. 84/708 |
| 4,701,956 A | * | 10/1987 | Katoh ......................... 381/61 |
| 5,131,042 A | * | 7/1992 | Oda ............................ 704/503 |
| 5,636,270 A | * | 6/1997 | Davey ........................ 379/352 |
| 2002/0198017 A1 | * | 12/2002 | Babasaki et al. ........... 455/550 |

FOREIGN PATENT DOCUMENTS

| JP | 54-061511 | 5/1979 |
| JP | S59-19355 | 5/1979 |
| JP | SHO 63-6796 | 2/1988 |
| JP | SHO 63-32393 | 6/1988 |

(Continued)

OTHER PUBLICATIONS

Korean Patent Office, "Office Action date Nov. 3, 2004,".

*Primary Examiner*—Marlon T. Fletcher
*Assistant Examiner*—David S. Warren
(74) *Attorney, Agent, or Firm*—Pillsbury Winthrop Shaw Pittman LLP

(57) ABSTRACT

A sound source circuit is provided for a telephone terminal to reproduce chorus-effect imparted musical tones as incoming call sound or hold sound. Herein, original musical tone data $\omega c1$ are slightly modified in pitches to produce musical tone data $\omega c2$ with respect to a prescribed tone color. These musical tone data are periodically selected and synthesized together to form musical tone signals having a chorus effect, based on which the chorus-effect imparted musical tones be reproduced for the telephone terminal such as a portable telephone.

7 Claims, 4 Drawing Sheets

FOREIGN PATENT DOCUMENTS

| | | |
|---|---|---|
| JP | HEI 2-10556 | 3/1990 |
| JP | 02-114299 | 4/1990 |
| JP | 09-068984 | 3/1997 |
| JP | H09-68984 | 3/1997 |
| JP | 10-150505 | 6/1998 |
| JP | H10-150505 | 6/1998 |

* cited by examiner

SOUND SOURCE CIRCUIT AND TELEPHONE TERMINAL USING SAME

This application is the National Phase of International Application PCT/JP00/08422 filed Nov. 29, 2000 which designated the U.S.

TECHNICAL FIELD

This invention relates to sound source circuits and telephone terminals using sound source circuits, which are preferable for use in portable telephones, automobile phones and small game devices.

BACKGROUND ART

Conventionally, when portable telephones and automobile phones receive calls, beep sounds are produced to notify users (or subscribers) of reception of incoming calls. However, beep sounds are offensive to ears of the users, so recently sound source circuits are frequently provided inside of the portable telephones to produce melody sounds as incoming call sounds.

It is required that the sound source circuits used in small-size devices such as portable telephones be reduced in size and inexpensive in cost. For this reason, monophonic sound source circuits are normally used in the portable telephones. However, the monophonic sound source circuits only produce sounds that are monotonous and thin in sound quality. To cope with such disadvantages, it is possible to propose an idea in which chorus effects are imparted to sounds to provide rich sound quality. Conventionally, imparting chorus effects to sounds is implemented by using effectors (or effect devices) following the sound source circuits. However, the sound source circuits coupled with the effectors are complicated in configuration and expensive in cost. Therefore, it is impractical for engineers to employ the sound source circuits coupled with the effectors for use in the portable telephones.

It is an object of this invention to provide a sound source circuit and a telephone terminal using it by which chorus effects can be imparted to sounds for notifying users of reception of incoming calls with a simple and inexpensive configuration.

DISCLOSURE OF INVENTION

A telephone terminal comprises a sound source circuit to reproduce chorus-effect imparted musical tones as incoming call sound or hold sound. Herein, there are provided at least two kinds of musical tone data, namely, original musical tone data $\omega c1$ and pitch-modified musical tone data $\omega c2$ that are slightly modified in pitches compared with the original musical tone data. These musical tone data are periodically selected by each prescribed period and are synthesized together to form musical tone signals having a chorus effect, based on which chorus-effect imparted musical tones are produced for the telephone terminal such as a portable telephone.

Upon receipt of an incoming call from a calling party, the telephone terminal rings the incoming call sound corresponding to the chorus-effect imparted musical tones to make notification to a called subscriber. When the called subscriber holds the telephone terminal for a while, the telephone terminal transmits signals representing the hold sound corresponding to the chorus-effect imparted musical tones to the calling party.

Using the chorus-effect imparted musical tones, it is possible to generate the incoming call sound or hold sound for the telephone terminal with diversity and variety of sound. In addition, this invention provides a simple configuration to realize the chorus effect without using an effector which is complicated and expensive.

BEST MODE FOR CARRYING OUT THE INVENTION

This invention will be described in detail by way of examples with reference to the accompanying drawings.

Figure 1:
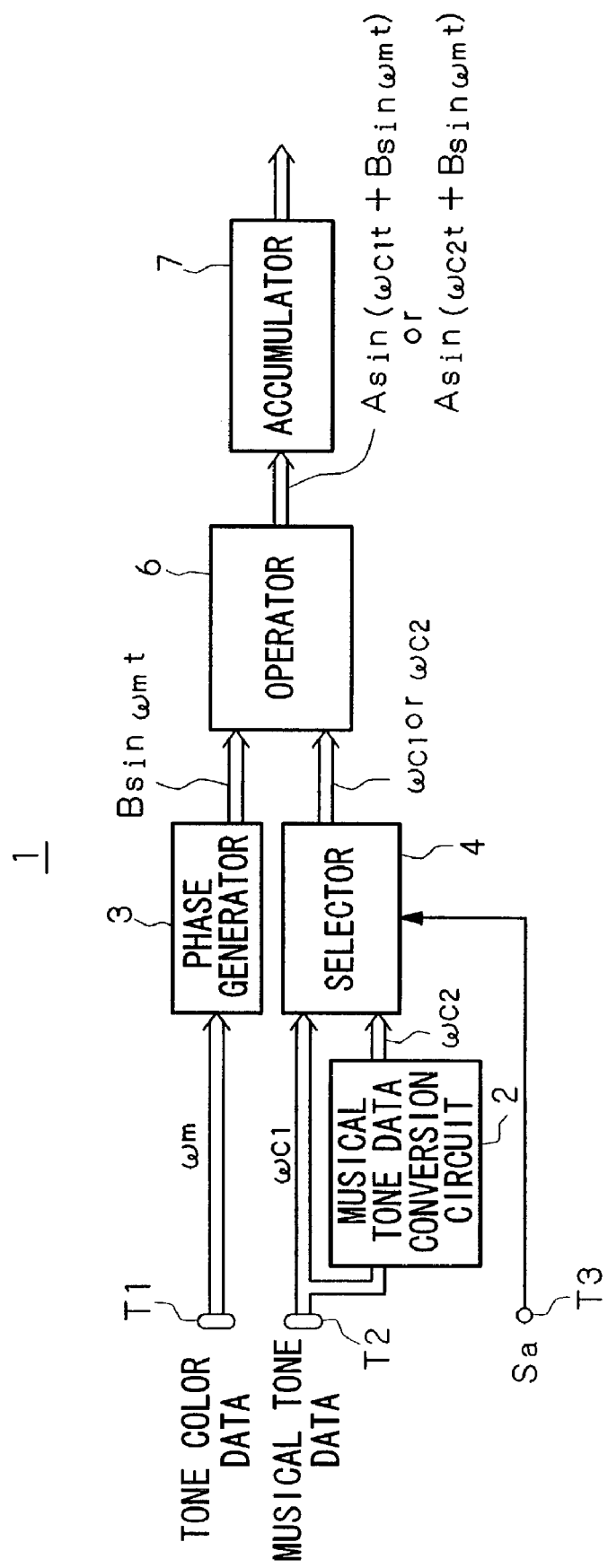
FIG. 1 is a block diagram showing a configuration of a sound source circuit in accordance with a first embodiment of the invention.

FIG. 1 shows a configuration of a sound source circuit 1 in accordance with a first embodiment of this invention. That is, the sound source circuit 1 of FIG. 1 is designed to form musical tone signals based on the FM modulation method. Herein, reference symbol T1 designates a terminal that receives tone color data $\omega m$ for determination of a tone color of musical tones; reference symbol T2 designates a terminal that receives musical tone data $\omega c1$ for designating pitches of musical tones; and reference symbol T3 designates a terminal that receives a periodic signal Sa. In addition, a musical tone data conversion circuit 2 converts the musical tone data $\omega c1$ to musical tone data $\omega c2$, which slightly differ from $\omega c1$ in value. For example, the musical tone data $\omega c2$ is produced by adding small numeric values such as '1' and '2' to the musical tone data $\omega c1$ or by subtracting the small numeric values from the musical tone data $\omega c1$.

A phase generator 3 generates modulation signals (or digital signals) and is constituted by a sawtooth wave generation circuit for generating sawtooth waves having slopes corresponding to the tone color data $\omega m$, and a sine wave table. That is, the sine wave table is accessed by output data of the sawtooth wave generation circuit, so it is possible to output sine waves having frequencies corresponding to the tone color data $\omega m$ as follows:

$$B \sin \omega m t$$

The periodic signal Sa is periodically changed in value between '1' and '0', and it is supplied to a selector 4 that selectively outputs the musical tone data $\omega c1$ or $\omega c2$. That is, the selector 4 outputs the musical tone data $\omega c1$ when the periodical signal Sa is '1'; or the selector 4 outputs the musical tone data $\omega c2$ when the periodic signal Sa is '0'. An operator 6 outputs sine waves that have a frequency corresponding to an output (i.e., $\omega c1$ or $\omega c2$) of the selector 4 and that are produced by effecting frequency modulation using sine waves output from the phase generator 3. That is, the operator 6 is constituted by a sawtooth wave generation circuit for generating sawtooth waves having slopes corresponding to the musical tone data $\omega c1$ or $\omega c2$, an addition circuit for adding together an output of the sawtooth wave generation circuit and an output of the phase generator 3, and a sine wave table. Herein, the sine wave table stores sine waves in accordance with the differential PCM method. That is, the sine wave table is accessed by an output of the addition circuit; therefore, it is possible to output modulated waves having frequencies corresponding to the musical tone data $\omega c1$ or $\omega c2$, as follows:

$$A \sin(\omega c1 t + B \sin \omega mt) \text{ or}$$

$$A \sin(\omega c2 t + B \sin \omega mt)$$

Then, an accumulator 7 accumulates data sequentially output from the operator 6 to form musical tone signals (or digital sound signals).

In the aforementioned configuration of FIG. 1, tone color data $\omega m$ is applied to the terminal T1; '1' signal is applied to the terminal T3; and musical tone data $\omega c1$ that is varied sequentially in response to a melody is applied to the terminal T2. Thus, the accumulator 7 outputs monophonic musical tone signals having a tone color corresponding to the tone color data $\omega m$ in response to the musical tone data $\omega c1$. If '0' signal is applied to the terminal T3, the accumulator 7 outputs monophonic musical tone signals in response to an output of the musical tone data conversion circuit 2, namely, musical tone data $\omega c2$ that is slightly varied in value compared with the musical tone data $\omega c1$. That is, it is possible to output musical tone signals that are slightly shifted in pitches compared with musical tone signals based on the musical tone data $\omega c1$.

The present embodiment provides a periodic signal Sa that is periodically changed in value between '1' and '0' by the prescribed frequency of 50 kHz, for example. When such a periodic signal Sa is applied to the terminal T3, the sound source circuit 1 alternately generates musical tone signals based on the musical tone data $\omega c1$ and musical tone signals based on the musical tone data $\omega c2$ by short periods respectively. In other words, the accumulator 7 outputs musical tone signals having a chorus effect that is substantially identical to the foregoing chorus effect imparted by the effector installed in an electronic musical instrument or the like. Incidentally, as the periodic signal Sa, it is possible to use a signal having a sampling frequency fs of musical tone data.

Figure 2A:
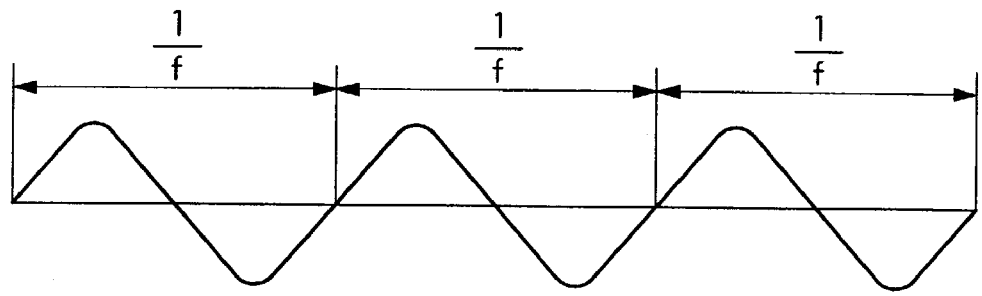
FIG. 2A shows an example of a waveshape of input musical tone data having a frequency f.
Figure 2B:
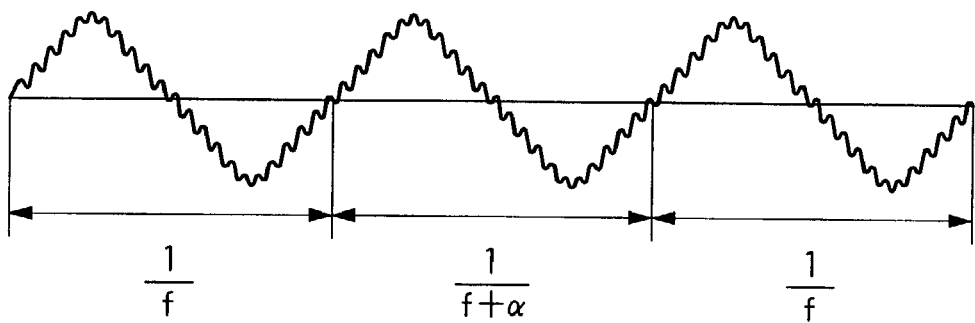
FIG. 2B shows an example of a waveshape of output musical tone data having a frequency f+α.

FIG. 2A shows an example of a waveshape of input musical tone data having a frequency f, which is input to the musical tone data conversion circuit 2 realizing a frequency increment $\alpha$. FIG. 2B shows an example of a waveshape of output musical tone data having a frequency f+$\alpha$, which is output from the musical tone data conversion circuit 2. Thus, the sound source circuit 1 alternately outputs musical tone signals having the frequency f and musical tone signals having the frequency f+$\alpha$.

According to the present embodiment, it is possible to obtain musical tone signals having a prescribed chorus effect with a very simple configuration.

Figure 3:
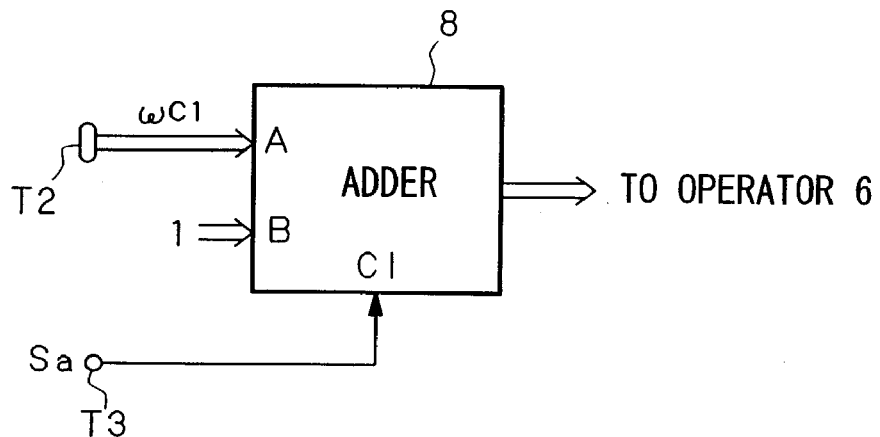
FIG. 3 shows an example in replacement of essential parts of the sound source circuit of FIG. 1.

Incidentally, the sound source circuit 1 can be modified to replace the musical tone data conversion circuit 2 and selector 4 with an adder 8 having three input terminals shown in FIG. 3. Herein, musical tone data $\omega c1$ is applied to a first input terminal A; '0' is applied to a second input terminal B; and a periodic signal Sa is applied to a carry-in terminal CI. When the periodic signal Sa is '0', the accumulator 7 outputs musical tone signals based on the musical tone data $\omega c1$ output from the adder 8. When the periodic signal Sa is '1', the accumulator 7 outputs musical tone signals based on addition results of the adder 8 in which '1' is added to the musical tone data $\omega c1$.

Figure 4:
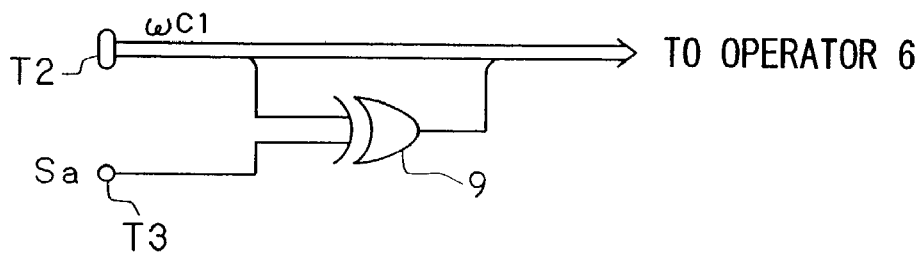
FIG. 4 shows another example in replacement of essential parts of the sound source circuit of FIG. 1.

In addition, the sound source circuit 1 can be modified to replace the musical tone data conversion circuit 2 and selector 4 with an exclusive-or circuit 9 having two inputs shown in FIG. 4. Herein, a first input of the exclusive-or circuit 9 corresponds to an LSB (i.e., a least significant bit) of the musical tone data $\omega c1$, while a second input corresponds to the periodic signal Sa. An output of the exclusive-or circuit 9 is added to the musical tone data $\omega c1$ as its least significant bit. Thus, when the periodic signal Sa is '1', the least significant bit of the musical tone data $\omega c1$ is inverted by the exclusive-or circuit 9. When the periodic signal Sa is '0', the least significant bit of the musical tone data $\omega c1$ is unchanged. Thus, it is possible to impart a chorus effect to musical tone signals.

Figure 5:
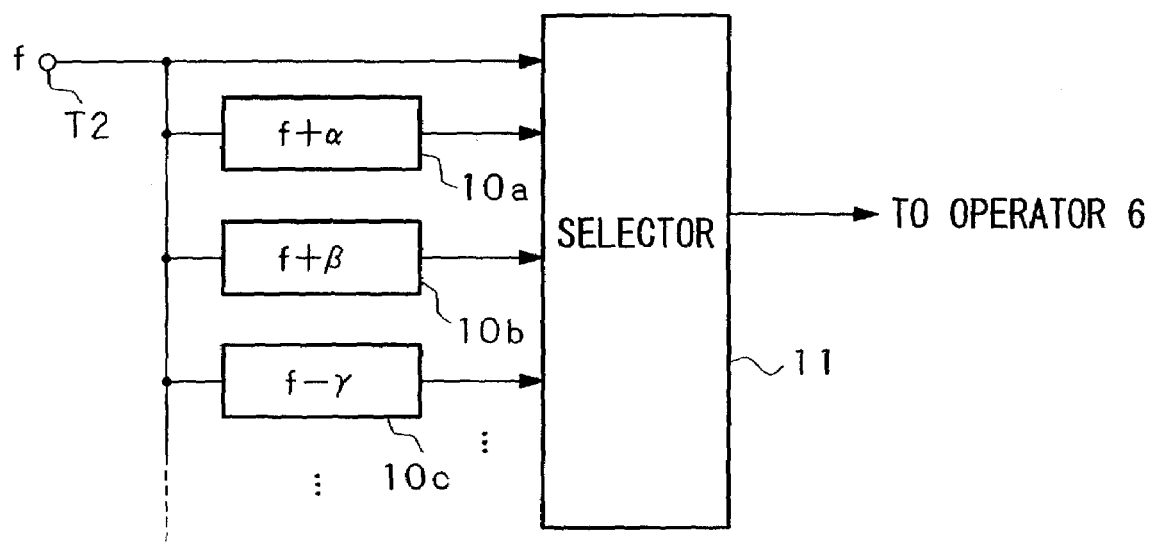
FIG. 5 shows a further example in replacement of essential parts of the sound source circuit of FIG. 1.

Further, the sound source circuit 1 can be modified to replace the musical tone data conversion circuit 2 and selector 4 with multiple musical tone data conversion circuits 10a, 10b, 10c, . . . , and a selector 11 which are shown in FIG. 5. Herein, each of the musical tone data conversion circuits provides a prescribed frequency increment or decrement with respect to an original frequency f of the musical tone data $\omega c1$ input thereto. That is, they convert the musical tone data $\omega c1$ having the frequency f to musical tone data having prescribed frequencies each of which slightly differs from the original frequency f. For example, the musical tone data conversion circuits 10a, 10b, and 10c respectively provide converted frequencies of f+$\alpha$, f+$\beta$ and f+$\gamma$. The selector 11 sequentially selects the musical tone data $\omega c1$ of the terminal T2 and outputs of the musical tone data conversion circuits 10a, 10b, 10c, . . . by prescribed periods, so that selected one is forwarded to the operator 6. Using such a configuration of FIG. 5, it is possible to realize diversity in chorus effects imparted to musical tones.

In FIG. 1, the selector 4 is not necessarily designed to alternately select the musical tone data $\omega c1$ applied to the terminal T2 and the musical tone data $\omega c2$ output from the musical tone data conversion circuit 2. That is, the selector 4 can be modified to arbitrarily set the number of times for selecting one of them. For example, the musical tone data $\omega c1$ is selected three times while the musical tone data $\omega c2$ output from the musical tone data conversion circuit 2 is selected only one time. Thus, it is possible to arbitrarily change a frequency of selecting the output data of the musical tone data conversion circuit 2 while selecting the musical tone data $\omega c1$ the prescribed number of times.

In addition, the musical tone data conversion circuit 2 provides an output frequency f+$\alpha$ (where f denotes an original frequency of the musical tone data $\omega c1$), which can be changed to 2f representing an overtone in a harmonics series. In the case of 2f, the sound source circuit 1 realizes so-called octave execution.

The present embodiment is designed to form musical tone signals in accordance with the FM modulation method. This invention is not necessarily limited to use the FM modulation method. Hence, it is possible to use other methods for formation of musical tone signals such as the PCM method (or wave memory method).

Figure 6:
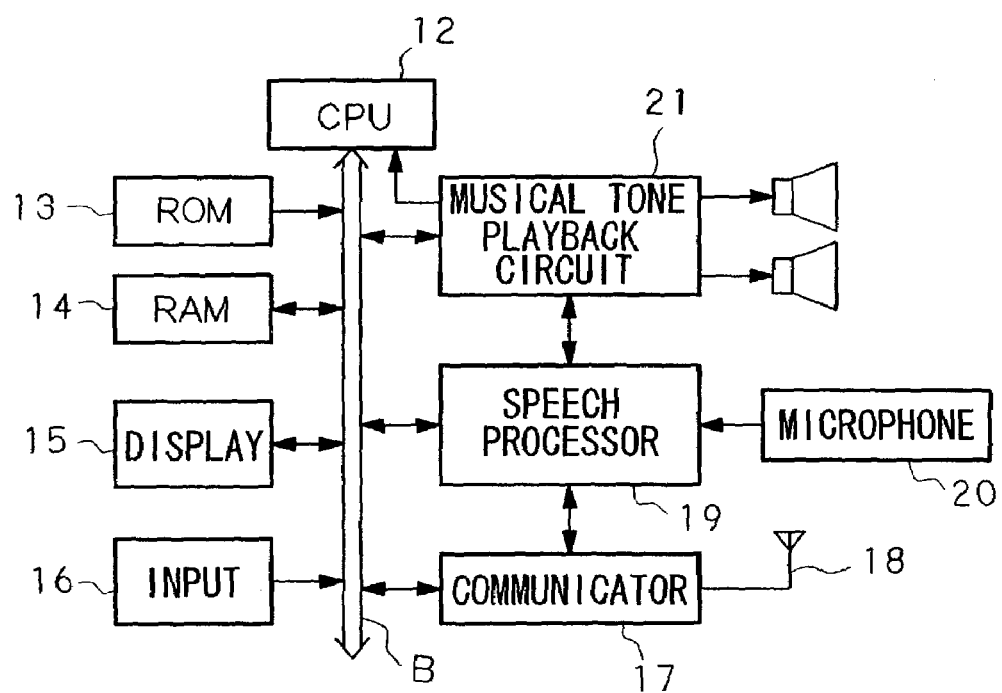
FIG. 6 is a block diagram showing a configuration of a telephone terminal in accordance with a second embodiment of the invention.
Figure 7:
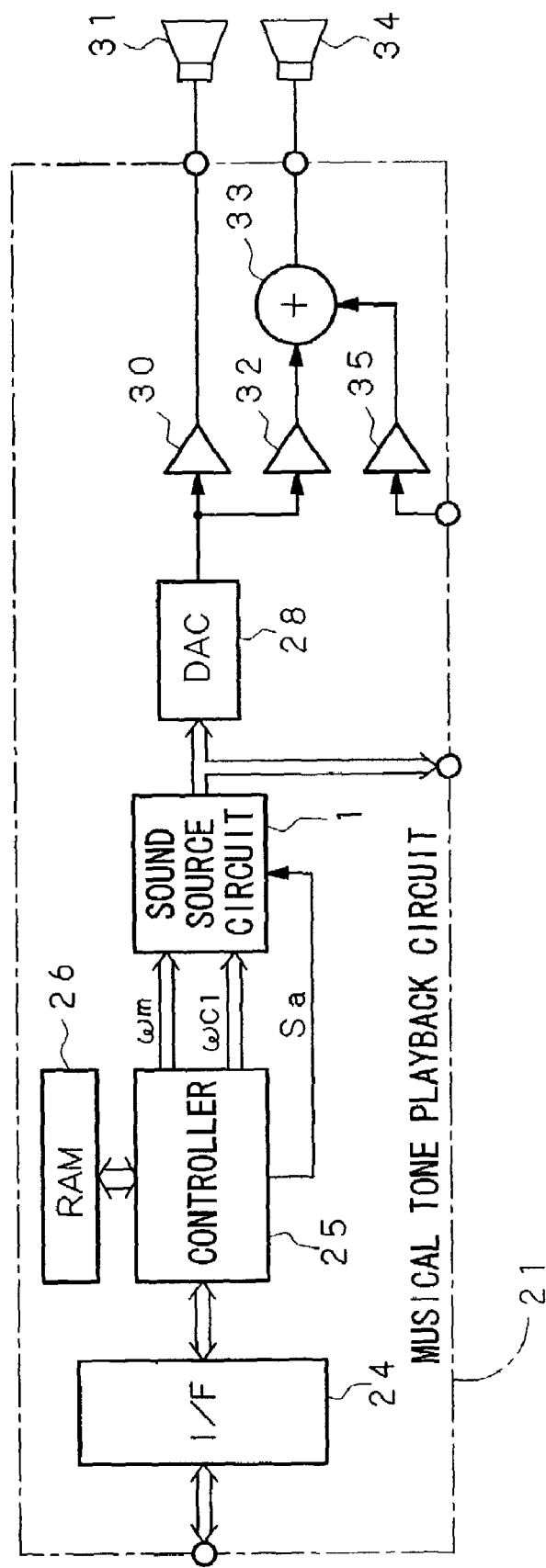
FIG. 7 is a block diagram showing an internal configuration of a musical tone playback circuit shown in FIG. 6.

Next, a second embodiment of this invention will be described with reference to FIGS. 6 and 7, which show a configuration of a portable telephone (namely, telephone terminal) that uses the sound source circuit 1 shown in FIG. 1. In FIG. 6, a CPU (central processing unit) 12 controls several parts and components of the portable telephone. A ROM 13 stores programs run by the CPU 12 as well as tone color data and musical tone data. Herein, there are provided two kinds of tone color data, namely, a tone color of ringing incoming call sound representing incoming calls and a tone color of hold sound for notifying a calling party of a hold event. In addition, a RAM 14 is provided to temporarily store various data. Further, a display 15 is constituted by a small-size liquid crystal display. Furthermore, an input section 16 is constituted by a ten-key unit and function keys.

A communicator 17 transmits signals on carrier waves via an antenna 18. In addition, the communicator 17 receives signals via the antenna 18 to demodulate and output them to a speech processor 19. The speech processor 19 decodes coded speech signals output from the communicator 17 and converts them to analog signals, which are forwarded to a musical tone playback circuit 21. In addition, the speech processor 19 encodes speech signals output from a microphone 20 to output them to the communicator 17.

The musical tone playback circuit 21 generates the aforementioned incoming call sound and hold sound. Details will be described with reference to FIG. 7. Herein, an interface circuit 24 receives data given from the CPU 12 via a bus B and sends them to a controller 25. That is, the controller 25 receives tone color data representing tone colors of incoming call sound and hold sound as well as corresponding musical tone data from the CPU 12 via the interface circuit 24. The tone color data are stored in an internal memory of the controller 25; and the musical tone data are stored in a RAM 26. When the CPU 12 issues an incoming call sound generation instruction, the controller 25 sets the tone color data of the incoming call sound to a sound source circuit 1. Then, it sequentially reads the musical tone data from the RAM 26 to send them to the sound source circuit 1. In addition, the controller 25 outputs a periodic signal Sa, which is produced by a system clock (not shown), to the sound source circuit 1. Thus, a prescribed chorus effect is imparted to the musical tone data related to the incoming call sound in the sound source circuit 1, which in turn outputs chorus-effect imparted musical tone data to a digital-to-analog converter (DAC) 28. The DAC 28 converts output data of the sound source circuit 1 to analog signals, which are supplied to a speaker 31 by way of a buffer 30. Thus, the speaker 30 produces the incoming call sound. In this case, a buffer 32 is placed in an OFF state in response to the incoming call sound generation instruction.

When the CPU 12 issues a hold sound generation instruction, the controller 25 sets the tone color data of the hold sound to the sound source circuit 1. Then, the controller 25 sequentially reads the musical tone data from the RAM 26 to send them to the sound source circuit 1. In addition, the controller 25 outputs a periodic signal Sa to the sound source circuit 1. Thus, a prescribed chorus effect is imparted to the musical tone data related to the hold sound in the sound source circuit 1, which in turn outputs chorus-effect imparted musical tone data to the DAC 28. The DAC 28 converts output data of the sound source circuit 1 to analog signals, which are supplied to a speaker 34 by way of the buffer 32 and a mixing circuit 33. Thus, the speaker 34 produces the hold sound. In this case, the buffer 30 is placed in an OFF state in response to the hold sound generation instruction. The musical tone data of the hold sound output from the sound source circuit 1 is also delivered to the communicator 17 by way of the speech processor 19, so that the communicator 17 transmits it to the calling party. Incidentally, reference numeral 35 designates a buffer that amplifies speech signals supplied from the speech processor 19.

According to the present embodiment, the portable telephone does not produce monophonic melody sound but is able to produce chorus-effect imparted melody sound as the incoming call sound and hang-on sound. Thus, it is possible to produce comfortable and pleasant melody sound, which is heard not only by the user of the portable telephone but also by persons around the user and by the calling party who listens to the hold sound.

As described heretofore, this invention provides a simple configuration for realizing chorus effects in generation of incoming call sound and hold sound of the portable telephone without using an effector which is complicated and expensive. There are provided at least two kinds of musical tone data, namely, original musical tone data $\omega c1$, and pitch-modified musical tone data $\omega c2$, which is slightly modified in pitch as compared with the original musical tone data, with respect to the prescribed tone color. These musical tone data are periodically selected by each prescribed period and are subjected to synthesis (e.g., addition or accumulation) to form musical tone signals having a chorus effect, based on which chorus-effect imparted musical tones are produced with diversity and variety of sound.

Lastly, this invention is not necessarily limited to the aforementioned embodiments, so this invention may be embodied in other forms without departing from the spirit of essential characteristics thereof

The invention claimed is:

1. A portable telephone terminal that generates an incoming call sound based on an incoming call or that generates a hold sound based on a hold sound reproduction instruction, said portable terminal comprising:
    a storage device for storing musical tone data representing tone pitches of musical tones;
    a control device for sequentially reading the musical tone data from the storage device;
    a sound source circuit for generating musical tone signals based on the read musical tone data; and
    a musical tone generation device for generating the incoming call sound or the hold sound based on the musical tone signals,
    wherein said sound source circuit includes:
    a conversion device to convert first musical tone data representing a first tone pitch, which is read by the control device, into second musical tone data representing a second tone pitch, which differs from the first tone pitch;
    a periodic signal generation device to generate a periodic signal having a high frequency;
    a selection device to alternately select the first musical tone data and the second musical tone data in response to the periodic signal; and
    a musical tone signal formation device to produce modulated waves having frequencies corresponding to the first musical tone data and the second musical tone data, which are alternatively selected by the selection device, thus forming musical tone signals,
    wherein the musical tone signal formation device alternatively and repeatedly outputs the modulated wave having the frequency of the first musical tone data and the modulated wave having the frequency of the second musical tone data based on a period of the periodic signal.

2. The portable telephone terminal according to claim 1, wherein the frequency of the periodic signal corresponds to a sampling frequency (fs) of the musical tone signals.

3. A portable telephone terminal that generates an incoming call sound based on an incoming call or that generates a hold sound based on a hold sound reproduction instruction, said portable terminal comprising:

a storage device for storing musical tone data representing tone pitches of musical tones;

a control device for sequentially reading the musical tone data from the storage device;

a sound source circuit for generating musical tone signals based on the read musical tone data; and a musical tone generation device for generating the incoming call sound or the hold sound based on the musical tone signals, wherein said sound source circuit includes:

a data processing device to alternately perform at a high frequency a first process to directly transfer first musical tone data, provided from an external source, designating a first tone pitch, and a second process to convert the first musical tone data to second musical tone data designating a second tone pitch that differs from the first tone pitch; and a musical tone signal formation device for producing modulated waves having frequencies corresponding to the first musical tone data and the second musical tone data, which are alternatively processed by the data processing device, thus forming musical tone signals, wherein the musical tone signal formation device alternatively and repeatedly outputs the modulated wave having the frequency of the first musical tone data and the modulated wave having the frequency of the second musical tone data based on a period of the periodic signal.

4. The portable telephone terminal according to claim 3, wherein the data processing device includes an exclusive or circuit that inverts a least significant bit of the first musical tone data by the periodic signal.

5. The portable telephone terminal according to claim 3, wherein the data processing device includes an addition circuit that alternately adds zero and a prescribed value to the first musical tone data.

6. A portable telephone terminal that generates an incoming call sound based on an incoming call or that generates a hold sound based on a hold sound reproduction instruction, said portable terminal comprising:

a storage device for storing musical tone data representing tone pitches of musical tones;

a control device for sequentially reading the musical tone data from the storage device;

a sound source circuit for generating musical tone signals based on the read musical tone data; and a musical tone generation device for generating the incoming call sound or the hold sound based on the musical tone signals, wherein said sound source circuit includes:

a conversion device to convert first musical tone data, provided from an external source, designating a first tone pitch to second to n-th musical tone data (where 'n' denotes an integral number) designating second to n-th tone pitches each slightly differing from the first tone pitch;

a periodic signal generation device to generate a periodic signal having a high frequency;

a selection device to sequentially select and output the first to n-th musical tone data in response to the periodic signal; and a musical tone signal formation device to produce modulated waves having frequencies corresponding to first to n-th musical tone data, which are consecutively output by the selection device, thus forming musical tone signals, wherein the musical tone formation device consecutively outputs the modulated waves having the frequencies corresponding to the first to n-th musical tone data based on a period of the periodic signal.

7. The portable telephone terminal according to claim 6, wherein the frequency of the periodic signal corresponds to a sampling frequency (fs) of the musical tone signals.

* * * * *